No. 847,093. PATENTED MAR. 12, 1907.
A. W. MITCHELL.
PAPER BOX MACHINE.
APPLICATION FILED MAR. 7, 1906.
7 SHEETS—SHEET 1.
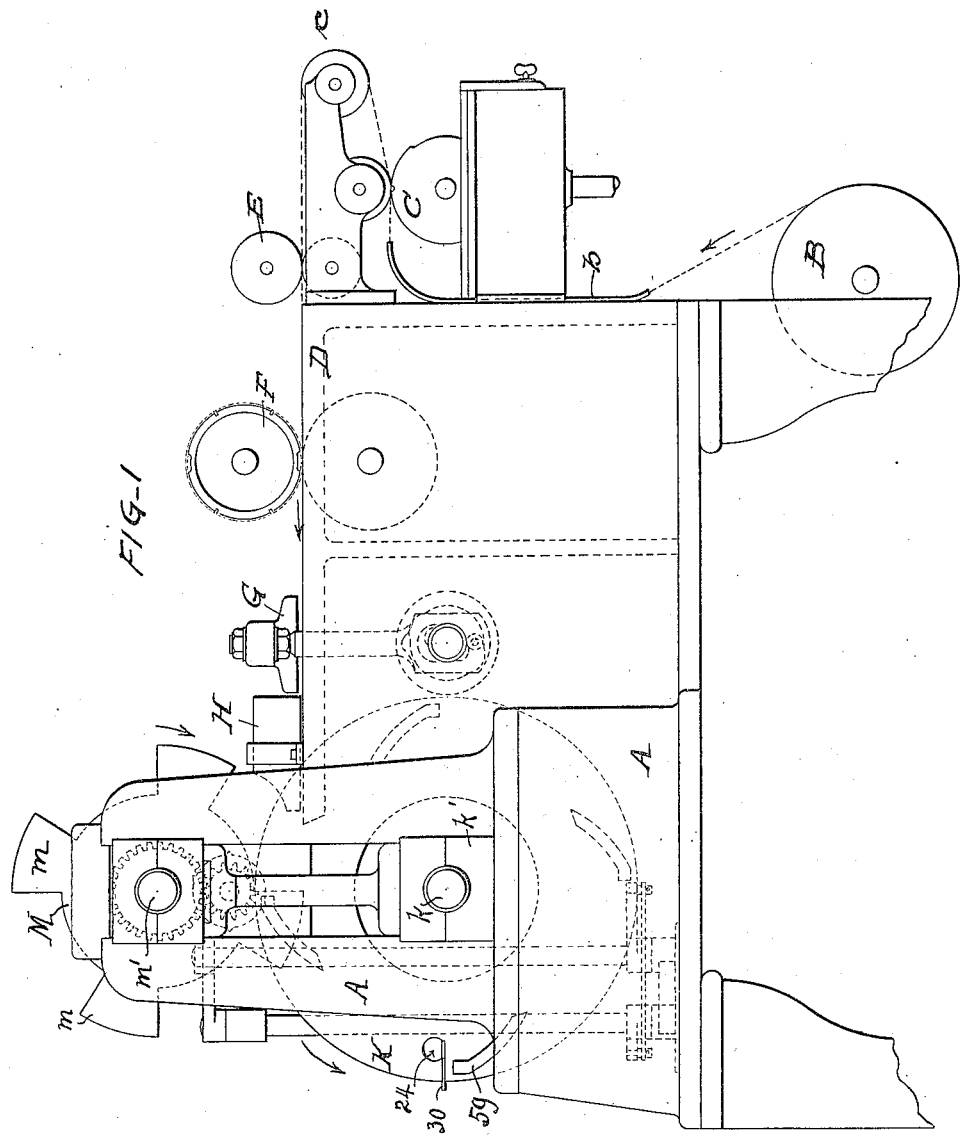
WITNESSES
Paul A Blair
Walter Abbe
INVENTOR
Albert W. Mitchell
BY Howson and Howson
ATTORNEYS No. 847,093.
PATENTED MAR. 12, 1907.
A. W. MITCHELL.
PAPER BOX MACHINE.
APPLICATION FILED MAR. 7, 1906.
7 SHEETS—SHEET 2.
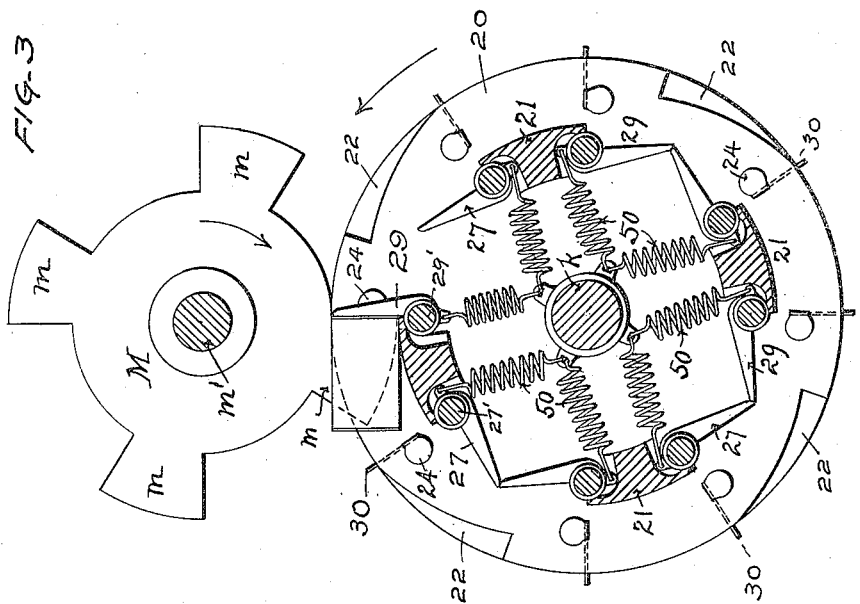
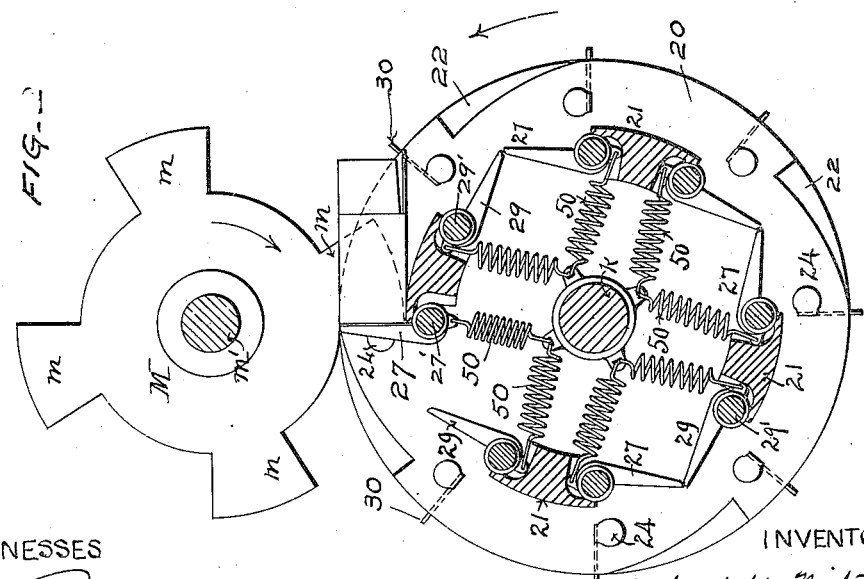
WITNESSES
INVENTOR
Albert W. Mitchell
BY Howson and Howson
ATTORNEYS No. 847,093.
PATENTED MAR. 12, 1907.
A. W. MITCHELL.
PAPER BOX MACHINE.
APPLICATION FILED MAR. 7, 1906.
7 SHEETS—SHEET 3.
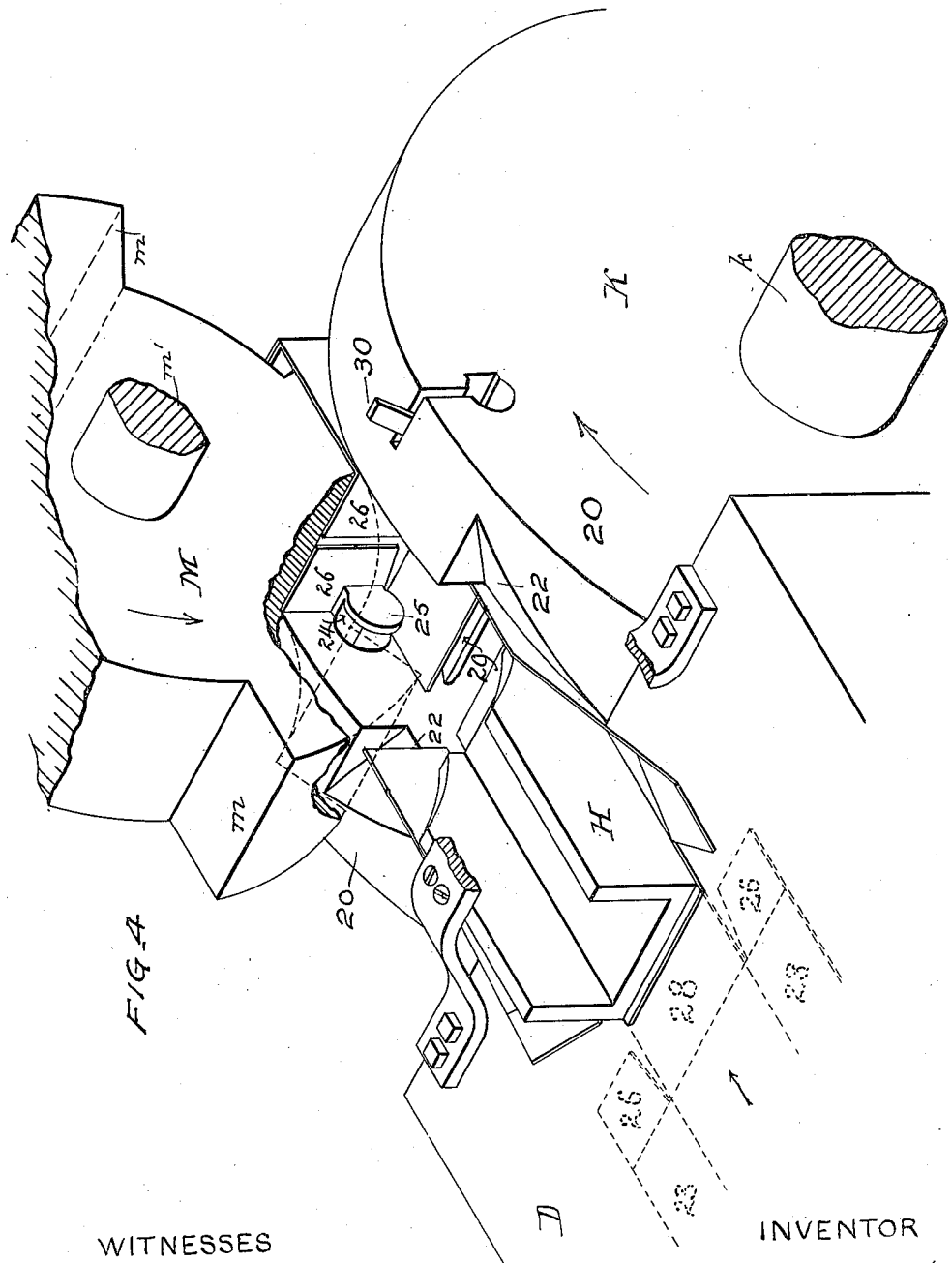
WITNESSES
INVENTOR
Albert W. Mitchell
BY
Howson and Howson
ATTORNEYS

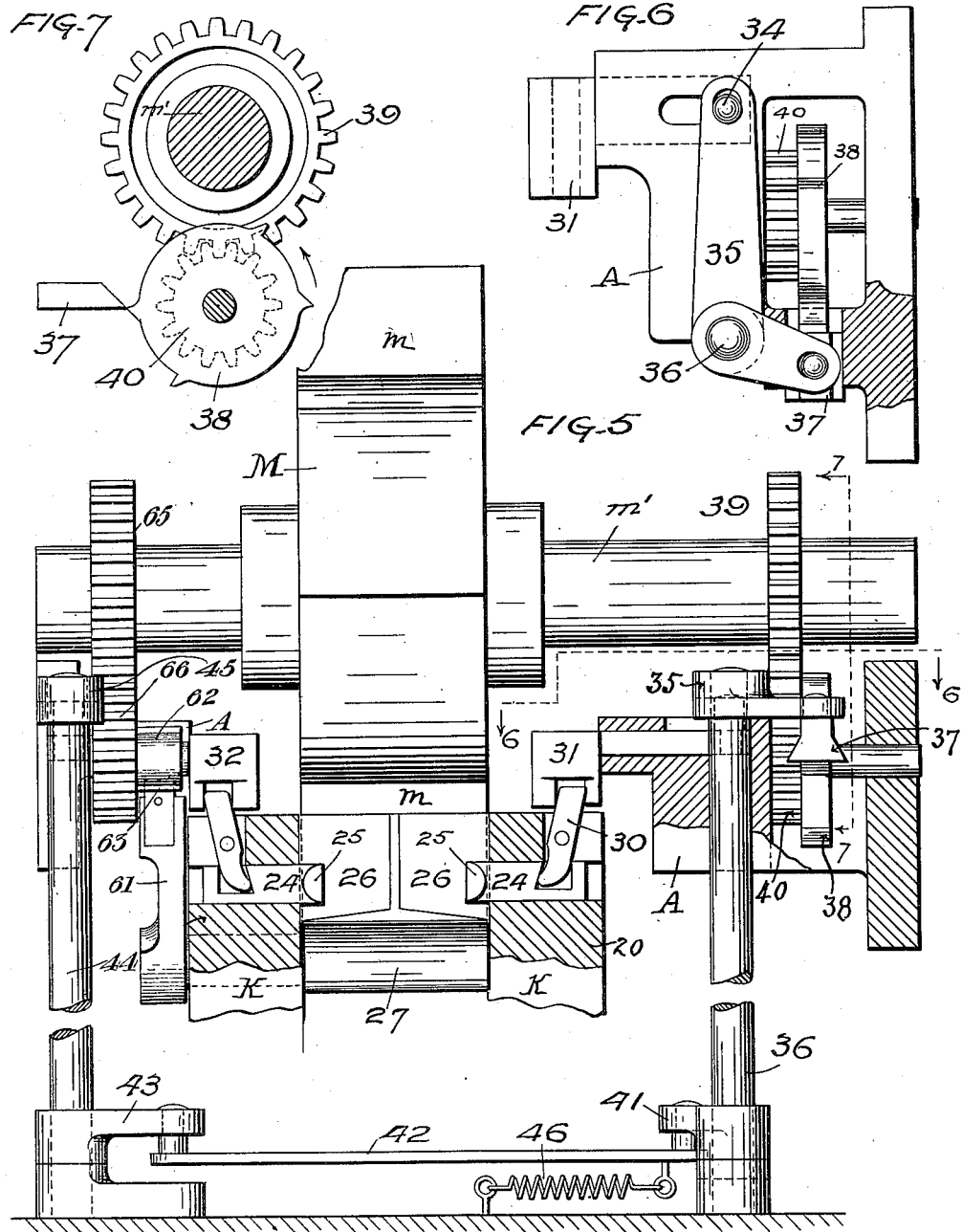

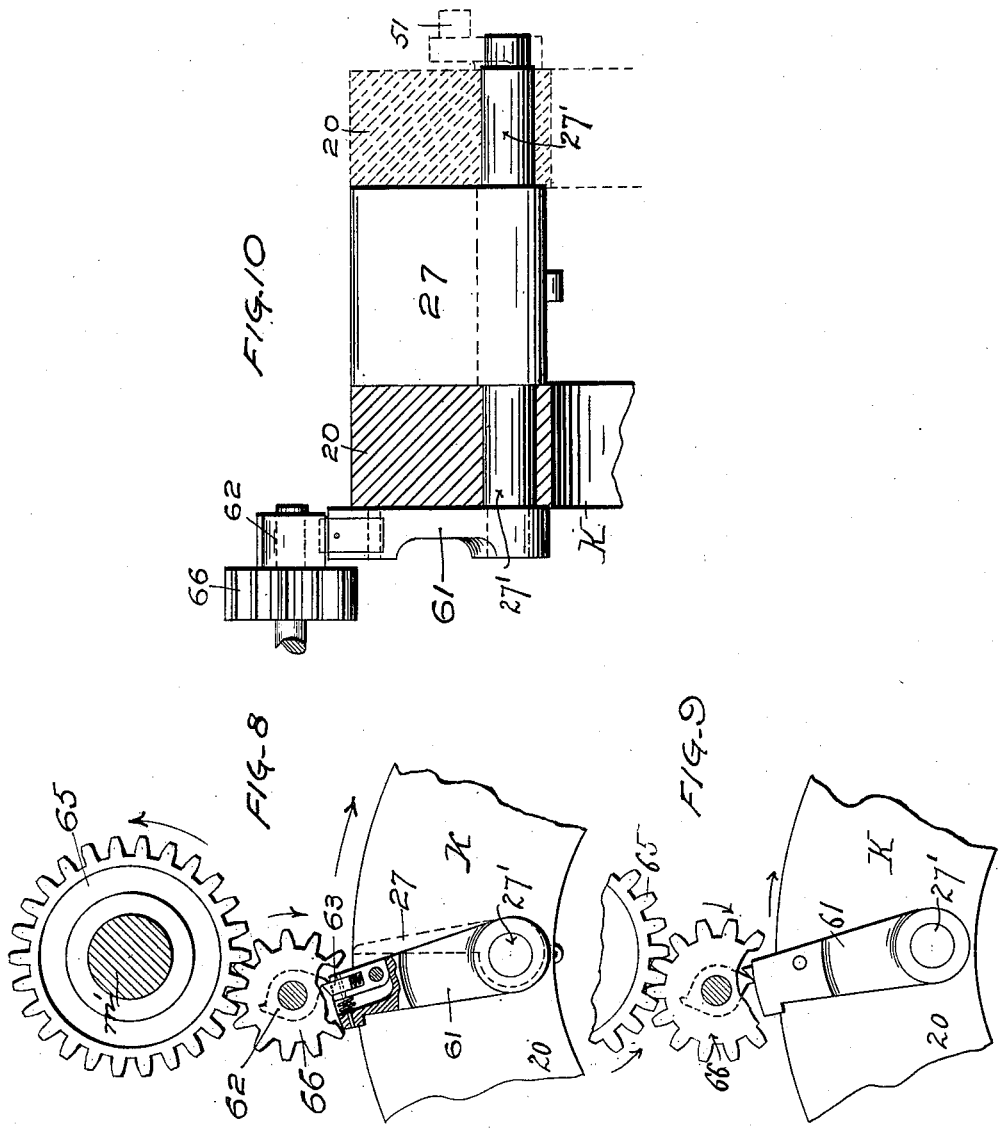

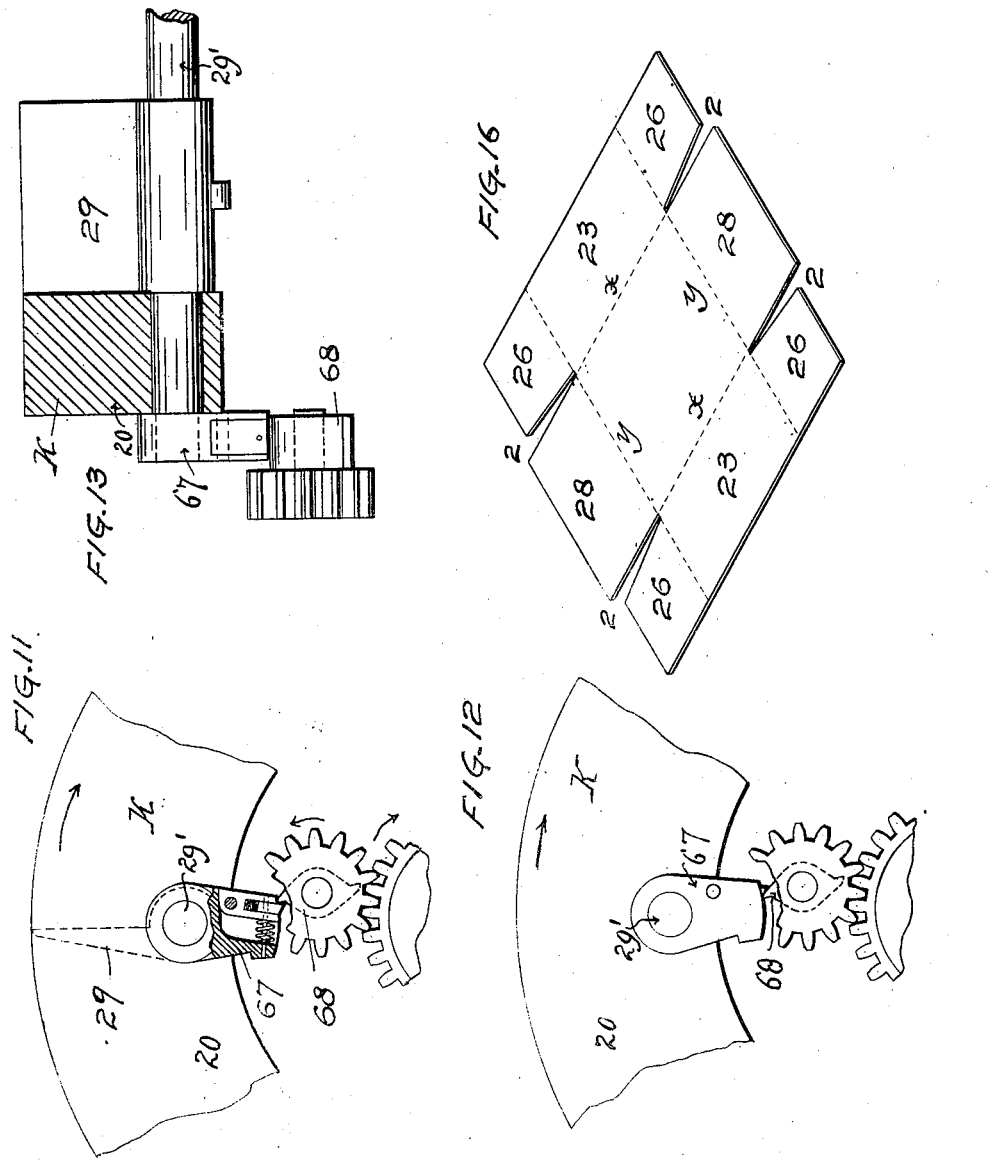

No. 847,093. PATENTED MAR. 12, 1907.
A. W. MITCHELL.
PAPER BOX MACHINE.
APPLICATION FILED MAR. 7, 1906.
7 SHEETS—SHEET 7.
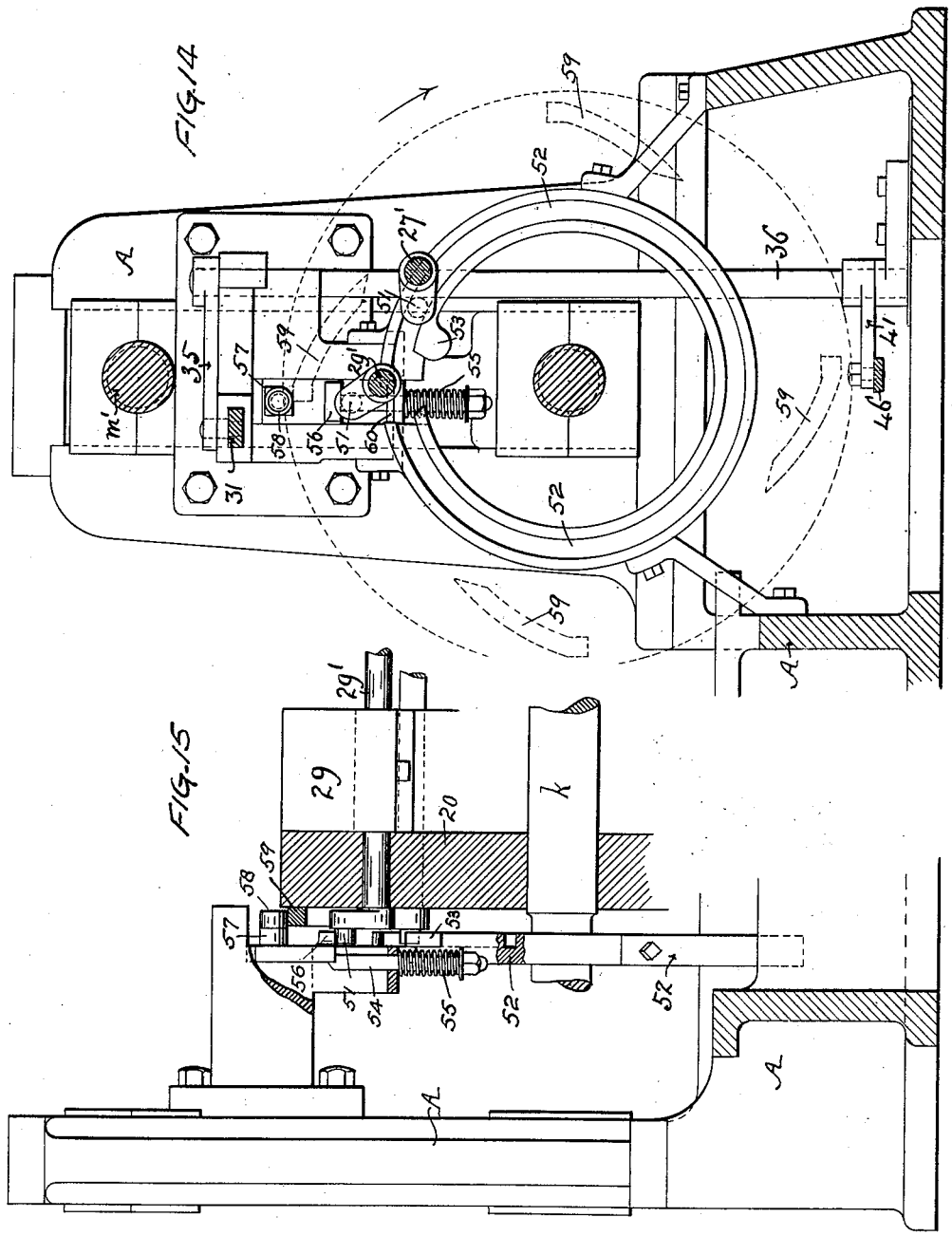
WITNESSES
INVENTOR
Albert W. Mitchell
BY
Howson and Howson
ATTORNEYS

UNITED STATES PATENT OFFICE.

ALBERT W. MITCHELL, OF NEW HAVEN, CONNECTICUT, ASSIGNOR, BY MESNE ASSIGNMENTS, TO JOHN N. LEONARD, TRUSTEE, OF NEW HAVEN, CONNECTICUT.

PAPER-BOX MACHINE.

No. 847,093.     Specification of Letters Patent.     Patented March 12, 1907.

Application filed March 7, 1906. Serial No. 304,673.

*To all whom it may concern:*

Be it known that I, ALBERT W. MITCHELL, a citizen of the United States of America, residing in the city of New Haven, in the county of New Haven and State of Connecticut, have invented certain new and useful Improvements in Paper-Box Machines, of which the following is a specification.

My invention relates more particularly to that class of paper-box machines in which rectangular boxes are formed from a strip of paper or pasteboard which is pasted, scored, and cut and then fed to a forming device, by means of which, in conjunction with folders, the sides of the blank are bent or folded up and the ends folded upon each other.

The main object of my invention is to so construct the machine as to increase its capacity and the speed of production of the boxes and to simplify the construction of the machine as compared with the usual machines for this work in which reciprocating plungers are employed.

One of the main features of my machine whereby these objects are accomplished consists in combining a continuously-rotating wheel carrying formers with another continuously-rotating wheel coöperating with the former-wheel and devices for folding first one end of the box and then the other, as will be hereinafter described.

In the accompanying drawings, Figure 1 is a side elevation illustrating the main features of my machine. Fig. 2 is a vertical section, on a larger scale, illustrating the parts at the moment when the flaps at the advance end of the box are being folded. Fig. 3 is a similar view showing parts moved to positions when the flaps at the rear end of the box are being folded. Fig. 4 is a perspective view drawn to a still larger scale and illustrating parts of the operation. Fig. 5 is a cross-sectional view illustrating one of the folding operations. Fig. 6 is a sectional plan view on the line 6 6, Fig. 5. Fig. 7 is a sectional view on the line 7 7, Fig. 5. Fig. 8 is a view illustrating devices for securing a closing pressure on one of the folding devices at the forward end of a box. Fig. 9 is a view of the same immediately after it is released. Fig. 10 is a sectional view at right angles to Fig. 8. Fig. 11 is a view similar to Fig. 8, but illustrating the folder for the rear end of the box. Fig. 12 is a view corresponding with Fig. 11, but illustrating the pressure device after it has passed to the release position. Fig. 13 is a sectional view at right angles to Fig. 11. Fig. 14 is a sectional view on the line 14 14, Fig. 15. Fig. 15 is a sectional elevation at right angles to the view Fig. 14, and Fig. 16 is a perspective view of one of the blanks ready to be fed to the folding devices.

Referring to Fig. 1, A is the frame of the machine, which may be of any suitable construction, and B is the roll of paper or pasteboard from which the blanks for the boxes are to be cut. The web of paper from the roll B passes up through the guide $b$ to suitable pasting-rollers C of any convenient construction and thence over an idler-roller $c$ to the table D, which is provided with suitable scoring-rollers, such as E and F, these scoring-rollers producing on the paper the longitudinal scores $x$ and the transverse scores $y$, Fig. 16. The web then passes to the cutters G, Fig. 1, which may be of any convenient construction and operation, provided they are adapted to cut out the gores $z$ and sever the blank from the web in the form shown in Fig. 16. The blank is then fed forward under the stationary forming-guide H, Figs. 1 and 4. The forward end of this guide H projects between the rings or disks 20 of the wheel K, which is mounted on a shaft $k$, turning in suitable bearings $k'$ in the frame, Fig. 1. Suitable mechanism is provided to impart to this shaft a continuous rotary motion in the direction of the arrow, Figs. 1 to 4, and a corresponding continuous rotary motion is at the same time imparted to the coöperating former-wheel M in the direction of its arrow, Figs. 1 to 4. This former-wheel M is provided with a number of radially-projecting formers $m$—four in the present instance—to coöperate with a like number of plates 21 in the wheel K, connecting the two disks 20 of that wheel K. The formers $m$ on the wheel M are of a width to enter between the two disks 20 of the wheel K, with just sufficient play to permit the edges of the paper blank which are to form the sides of the box to be folded up between the opposite sides of each former $m$ and the inner sides of the disks 20, Fig. 5. As will be readily seen by reference to Figs. 2 and 3, the formers $m$ are not of the shape of the box to be made, but are rounded on their outer ends, and at their inner ends where they join the body of the wheel they are narrower than the box to be formed. Thus in the case of a rectangular box, as illustrated, each former $m$ is made of the segmental outline shown in Figs. 2 and 3, the forward and rear walls being on planes radiating from the axis of the former-wheel M.

The disks 20 of the wheel K are formed on their inner edges at intervals with beveled parts 22, Figs. 2, 3, and 4, into which the forward edges of the successive blanks are fed, Fig. 4, and as the disks 20 move forward in the direction of the arrow, Fig. 4, these beveled notches tend to turn up the sides 23 of the blank preparatory to the action of the approaching former $m$, which then completes the folding up of the sides 23 of the blank, Figs. 4 and 14, between the former $m$ and the inner faces of the disks 20, Fig. 5.

In connection with the described wheels folding devices are provided to fold in first the forward end flaps and then the rear end flaps of the blank. By preference I mount these folding devices in the wheel K. First there are the side-flap-folding devices, consisting of two slides 24, guided transversely in the disks 20 and bent at their inner or acting ends 25. Devices are provided to act upon these laterally-moving slides to move them inward to the position shown in Fig. 5 to turn the side flaps 26 of the blank inward to the position illustrated in that figure and in Fig. 4. I provide means whereby the slides 24 are then instantly drawn back again, so that then the hinged folder 27, Fig. 2, may come into play to throw up onto the inturned flaps 26 the end flap 28 of the blank, Fig. 2. These flaps have already been gummed at C, Fig. 1, on what will become their adjacent faces, so that when pressed together against the forward face of the former $m$ they will adhere. Fig. 2 shows the hinged folder 27 thrown up into the position where it has closed the end flap 28 at the forward end of the blank onto the inwardly-turned side flaps 26. As the wheels M and K move forward, the hinged folder 27 is thrown down again, Fig. 3, and when the wheels are approaching the position indicated in Fig. 3 the laterally-sliding folders adjacent to the rear end of the box-blank and similar to folders 24 are thrown into action to turn inward the rear side flaps 26. Then these side folders 24 are withdrawn and the hinged rear folder 29 is thrown up, as shown in Fig. 3, to fold the rear flap 28 over the side flaps 26, which have been already turned in at the rear of the box. These flaps have also been previously pasted, so that when thus folded onto each other they will adhere. In this manner the boxes are formed from the blanks in continuous manner at a speed greatly exceeding that at which intermittently-moving formers can work.

While various devices may be employed for actuating the folders, I will now describe mechanisms which are adapted for the purpose.

First, with reference to the side folders 24, they may be acted upon by pivoted levers 30, Figs. 4 and 5, which in turn are at the proper moment acted on to move the sliding folders inwardly by means of the lateral movable slides 31 and 32, Fig. 5, in the stationary side frames A. One of these slides 31 has at its rear end a pin 34, Fig. 6, acted on by the long arm of a bell-crank lever 35 on a shaft 36 in the frame. The other arm of the bell-crank lever is acted upon by a slide 37, guided in the frame and adapted to be actuated by a rotating cam 38, Figs. 6 and 7, which may be operated from any suitable moving part of the machine—as, for example, by a gear 39 on the shaft $m'$ of the former-wheel M gearing into a pinion 40 on the shaft which carries the cam 38, Figs 5, 6, and 7. Thus each time a cam on the wheel 38 strikes the slide 37 motion is transmitted through the bell-crank lever 35 to the slide 31 and thence through the lever 30 to throw the corresponding folder 24 inwardly to the position shown in Fig. 5. A like and simultaneous motion is imparted to the opposite slide 32 to act on its folder 24 through the connections illustrated in Fig. 5. For this purpose the bell-crank 35 is mounted on the vertical spindle 36, Figs. 5 and 14, which at its lower end has a crank 41, connected through a rod 42 to a like crank 43, Fig. 5, on an upright spindle 44, the upper end of which has an arm 45, corresponding to the long arm of the bell-crank lever 35, to act on the slide 32, as will be readily understood.

To withdraw the sliding folders 24, a suitable spring may be provided at any suitable point—as, for example, 46, Fig. 5—to draw back the described parts to their former positions with the folders 24 withdrawn as soon as the slide 37, Fig. 7, is released from the passing cam on the wheel 38.

Referring now to the hinged folders 27 and 29, it will be seen that all these folders are so acted upon by spiral springs 50, Figs. 2 and 3, as to tend to throw these folders outward to the radial positions which they occupy in folding up the ends of the blanks; but means are provided for normally holding these folding-blades 27 29 back in the positions illustrated in Figs. 2 and 3 for all the blades but one. For this purpose I carry the axis 27' 29' of each hinged blade through the side disks 20 to the outside, and at one end I provide it with a crank-pin 51, Figs. 10, 14, and 15. This crank-pin 51 is adapted to run in a circular fixed trackway 52, fixed to the frame. When the crank-pins of the several hinged folding-blades are thus guided in the grooved trackway 52, those blades will be held in the backward positions illustrated in Figs. 2 and 3 for all except one of the blades, and this against the tension of their springs 50. This trackway 52 is cut away at 60, Fig. 14, so that when each one of the crank-pins 51 comes to the cut 60 it can spring out of the retaining-trackway 52 under the action of the spring 50 acting on the blade. In the case of the forward blades 27—that is, those hinged blades which fold up the forward ends of the boxes—the cranks jump out of the guiding-groove toward the center of the circle, and then as the wheel K turns forward in the direction of the arrow, Fig. 14, the crank-pin will come up against the cam 53, which will guide the crank-pin back again into the grooved trackway.

In the case of the rear folding-blades 29 the cranks when they come to the cut 60 will jump outward, as indicated in Fig. 14. To bring these crank-pins of the blades 29 back again into the guiding-groove, I may provide a vertical rod 54, Figs. 14 and 15, acted on by a powerful spring 55 and having a projecting shoulder 56 lying over the point where the crank-pin will come out of the cut 60. The upper end of this rod 54 has a shoulder 57, with or without an antifriction-roller 58, and this shoulder is acted on by a series of cams 59, Figs. 1, 14, and 15, on the outer face of the adjacent disk 20 of the wheel M. These cams 59 at the proper time act on the shoulder 57 and roller 58 of the rod 54, so as to lift the latter and tension the spring 55, as indicated in Figs. 14 and 15; but when the folding action of the blade 29 is completed the shoulder 57 of the rod 54 will have passed off the high point of the corresponding cam 59, and then the spring 55 will throw the rod 54 downwardly and cause the shoulder 56 to so act upon the crank-pin 51, which is then out of the cut 60, as to throw that crank-pin downwardly and hold it until it has passed into the control of the grooved trackway 52 again as the wheel M advances.

I prefer to provide means for imparting to the folding-blades 27 and 29 an extra pressure to make sure that the gummed folded flaps will adhere together better. For this purpose I mount on the end of the spindle 27' of each folding-blade 27—that is, the end opposite that which carries the crank-pin—an arm 61 with a spring-latch 63, Figs. 8, 9, and 10, and in suitable position with reference to this latch I provide a rotary catch-piece 62, rotated, as by means of a gear 65, on the shaft m', meshing into a pinion 66, attached to the catch-piece 62. The parts will be assumed to be rotating in the directions indicated by the several arrows in Fig. 8, with the result that at the moment that the folding-blade 27 has pressed up the forward flap one of the catches of the catch-piece 62 will engage the spring-latch 63 on the arm 61, thereby causing a momentary extra pressure of the blade 27 against the flap. Then the catch-piece 62 will escape from the spring-latch 63, as indicated in Fig. 9. A similar construction is adopted for the rear folding-blade 29, Figs. 11, 12, and 13. In this case, however, the arm 67 on the spindle 29' of the folding-blade 29 projects toward instead of from the axis of the wheel M, and the corresponding catch-piece 68 will be rotated from the shaft of the lower wheel K.

In this specification I use the term "disks" for the parts 20 of the wheel K in a sufficiently general sense to apply to the sides of the wheel whether in solid or open form.

I claim as my invention—

1. A paper-box machine having two coöperating wheels, one carrying radially-projecting formers and the other of which has two disks between which said formers may pass and devices to act in conjunction with the formers to fold the flaps of the box-blanks.

2. A paper-box machine, having two coöperating wheels, one carrying radially-projecting formers and means for folding the flaps first at one end of the blank and then those at the other end of the blank against a former.

3. A paper-box machine, having two coöperating wheels, one carrying radially-projecting formers of an outline different from the box to be formed, and means for folding the flaps first at one end of the blank and then those at the other end of the blank against a former.

4. A paper-box machine, having two coöperating wheels, one carrying segmental formers, means for folding against the segmental former the flaps of the box-blank first at one end of the blank and then those at the other end.

5. A paper-box machine, having two coöperating wheels, one carrying radially-projecting formers and the other of which has two disks between which said formers may pass and devices to act in conjunction with the formers to fold the flaps of the box-blank, and means for imparting continuous rotary motion to the wheels.

6. A paper-box machine, having two coöperating wheels, one carrying radially-projecting formers and means for folding the flaps first at one end of the blank and then those at the other end of the blank against a former, and means for imparting continuous rotary motion to the wheels.

7. A paper-box machine, having two coöperating wheels, one carrying radially-projecting formers of an outline different from the box to be formed, and means for folding the flaps first at one end of the blank and then those at the other end of the blank against a former, and means for imparting continuous rotary motion to the wheels.

8. A paper-box machine, having two coöperating wheels, one carrying segmental formers, means for folding against the segmental former the flaps of the box-blank first at one end of the blank and then those at the other end, and means for imparting continuous rotary motion to the wheels.

9. A paper-box machine, having two coöperating wheels, one carrying formers and the other having two disks between which the formers may pass and folders for folding in the ends of the blank first at one end of the blank and then at the other end.

10. A paper-box machine, having two coöperating wheels, one carrying formers and the other having two disks between which the formers may pass and devices on the second wheel for folding the side and end flaps first at one end of the blank and then at the other end.

11. A paper-box machine, having two coöperating wheels, one carrying radially-projecting formers and the other carrying sliding folders to fold the side flaps and folders to fold the end flaps.

12. A paper-box machine, having two coöperating wheels, one of which has formers and the other of which has two disks, between which the formers may pass, these disks carrying devices to fold in the side flaps and then to fold the end flaps first at one end of the blank and then at the other.

13. A paper-box machine, having two coöperating wheels, one carrying formers and the other having two disks with notched inner edges to receive the blanks to start the side folds of the box, the formers passing between the disks to complete the side folds, and means for folding the flaps first at the forward end of the blank and then at the rear end of the blank.

14. A paper-box machine, having two coöperating wheels, one carrying radially-projecting formers and means for folding the flaps first at one end of the box-blank and then the flaps at the other end, and devices for imparting an extra pressure to the folding means.

15. A paper-box machine, having two coöperating wheels, one carrying formers and the other carrying hinged folding-blades to fold the end flaps of the blanks and means for imparting an extra pressure to the blades when the flaps have been folded.

16. A paper-box machine, having two coöperating wheels, one carrying formers and the other having two disks notched at their inner edges and a stationary guide projecting between the disks and over which the folding of the blank may be begun as the blank enters the notches of the disks.

In testimony whereof I have signed my name to this specification in the presence of two subscribing witnesses.

ALBERT W. MITCHELL.

Witnesses:
ARTHUR W. CHAMBERS,
HARRY G. DAY.